(12) United States Patent
Ovaere et al.

(10) Patent No.: US 11,408,303 B2
(45) Date of Patent: Aug. 9, 2022

(54) BEARING SUPPORT FOR AN AIRCRAFT ENGINE MANUFACTURED BY ADDITIVE MANUFACTURING

(71) Applicant: SAFRAN AIRCRAFT ENGINES, Paris (FR)

(72) Inventors: Nicolas Ovaere, Moissy-Cramayel (FR); Jacques Marcel Arthur Bunel, Moissy-Cramayel (FR); Thomas Gricourt, Moissy-Cramayel (FR); Paul André Somazzi, Moissy-Cramayel (FR); Sylvain Zambelli, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/982,363

(22) PCT Filed: Mar. 19, 2019

(86) PCT No.: PCT/FR2019/050613
§ 371 (c)(1),
(2) Date: Sep. 18, 2020

(87) PCT Pub. No.: WO2019/180365
PCT Pub. Date: Sep. 26, 2019

(65) Prior Publication Data
US 2021/0033003 A1 Feb. 4, 2021

(30) Foreign Application Priority Data
Mar. 23, 2018 (FR) .................................. 18 52560

(51) Int. Cl.
*F01D 25/16* (2006.01)
*B33Y 80/00* (2015.01)
(Continued)

(52) U.S. Cl.
CPC ............ *F01D 25/162* (2013.01); *B22F 10/00* (2021.01); *B22F 10/40* (2021.01); *B33Y 80/00* (2014.12);
(Continued)

(58) Field of Classification Search
CPC .... F01D 25/162; F01D 25/164; F01D 25/183; F05D 2230/22; F05D 2230/31;
(Continued)

(56) References Cited

U.S. PATENT DOCUMENTS

2013/0227930 A1* 9/2013 Pegan, Jr. ............. F01D 25/162
 415/220
2019/0022927 A1 1/2019 Vial et al.

FOREIGN PATENT DOCUMENTS

DE 10 2015 010 388 A1 2/2017
FR 3 025 491 A1 3/2016
FR 3 046 556 A1 7/2017

OTHER PUBLICATIONS

International Search Report dated Jul. 10, 2019 in PCT/FR2019/050613 filed on Mar. 19, 2019, citing documents AA-AB and AO-AQ therein, 3 pages.
(Continued)

*Primary Examiner* — Loren C Edwards
(74) *Attorney, Agent, or Firm* — Oblon, McClelland, Maier & Neustadt, L.L.P.

(57) ABSTRACT

A bearing support for an aircraft engine, manufactured, in one piece, by powder-bed additive manufacturing from a manufacturing platform, including a cylindrical element including an annular stiffener with a cross-section that changes along its circumference, this stiffener being formed with alternating portions having a Γ-shaped cross-section,
(Continued)

needing to be supported during the manufacture, and portions having a Y-shaped cross-section that are not supported during the manufacture.

6 Claims, 5 Drawing Sheets

(51) Int. Cl.
  *B22F 10/00* (2021.01)
  *B22F 10/40* (2021.01)
(52) U.S. Cl.
  CPC ........ *F01D 25/164* (2013.01); *F05D 2230/22* (2013.01); *F05D 2230/31* (2013.01); *F05D 2250/75* (2013.01)
(58) Field of Classification Search
  CPC ..... F05D 2250/75; B33Y 80/00; B22F 10/00; B22F 10/20; B22F 10/40; B22F 5/009
  See application file for complete search history.

(56) References Cited

OTHER PUBLICATIONS

Preliminary French Search Report dated Nov. 23, 2018 in French Application No. 18 52560 filed Mar. 23, 2018, citing documents AA and AO-AQ therein, 1 page.

\* cited by examiner

BEARING SUPPORT FOR AN AIRCRAFT ENGINE MANUFACTURED BY ADDITIVE MANUFACTURING

TECHNICAL FIELD

The present invention relates to the forming of an aircraft engine bearing support by additive manufacturing.

GENERAL CONTEXT OF THE INVENTION

A bypass turbojet includes an input sleeve receiving the air upstream which is sucked by a low-pressure compressor, before being divided into a central primary flow and a secondary flow surrounding the primary flow. After having passed the low-pressure compressor, the secondary flow is propelled downstream to generate a thrust by being blown around the primary flow, upstream and downstream being defined in relation to the direction of the flow of fluid in the turbojet.

After having passed the low-pressure compressor, the primary flow passes through a high-pressure compressor before reaching a combustion chamber. This primary flow is then expanded in a high-pressure turbine linked in rotation with the high-pressure compressor, then in a low-pressure turbine linked in rotation to the low-pressure compressor, before being expelled downstream.

In the case of a two-spool turbojet, the high-pressure compressor and the high-pressure turbine are part of a high-pressure body that surrounds a low-pressure shaft by running at a speed that is different from the latter, this low-pressure shaft carrying the low-pressure compressor and the low-pressure turbine.

The low-pressure shaft and the high-pressure body are carried upstream and downstream by bearings housed in enclosures that isolate them from the rest of the engine. Each bearing is lubricated by oil circulating in the enclosure that surrounds it, and that is defined by stationary elements and by the rotating element that passes through it. Such a bearing is carried by a support while being surrounded by the enclosure.

FIG. 1, of a section of a downstream portion of a turbojet 1 according to a design possibility that the invention proposes to improve, shows a low-pressure shaft 2, at the downstream end of which a ferrule 3 is secured that extends radially to be secured to discs 4 of a low-pressure turbine 5 extending around a downstream portion of the shaft 2.

The shaft 2 is surrounded in the downstream region thereof by a bearing support 6 that carries a sleeve 7 designed to receive a roller bearing 8 to support the downstream portion of the shaft 2, and that is secured to a stationary element 9 of the engine located at the upstream thereof, via a cone 10. This cone 10 widens from the downstream portion thereof where it is secured to the support 6, to the upstream portion thereof where it is secured to the stationary element 9.

The cone 10 is surrounded by a cylindrical element 11 secured to the upstream portion thereof that it extends downstream, to define with this cone 10 and with the ferrule 3 a portion of an enclosure 12 that encloses the bearing.

As can be seen in FIG. 2 of a design possibility that the invention proposes to improve, a skirt 13 and two revolution bodies 14 and 15 extend the central region of the cone 10 respectively upstream and downstream, this skirt and these bodies having outer diameters of about the inner diameter of the cone 10. An upstream support 16 including a ring through which it is fastened to the upstream of the skirt 13 carries a segmented radial seal 17 that defines an enclosure 18 upstream from the bearing 8. The revolution element 14 jointly defines with the shaft 2 two concentric enclosures 19 and 20 located downstream from the bearing 8.

In light of the manufacturing and mounting constraints with conventional techniques, these components, namely the support 6, the cone 10, the cylindrical element 11, the skirt 13, the element 14 and the upstream support 16 are fastened to one another according to different methods including in particular TIG welding.

Generally, designing and manufacturing a bearing support are complex and expensive operations that involve a multitude of processes.

The purpose of the invention is to provide a solution to overcome this disadvantage

DISCLOSURE OF THE INVENTION

For this purpose, the invention has for object a bearing support for an aircraft engine, manufactured in one piece by powder-bed additive manufacturing from a manufacturing platform, comprising a cylindrical element including an annular stiffener with a cross-section that changes along its circumference, this stiffener being formed with alternating portions having a cross-section, as a radial cross-section of the cylindrical element, of a shape corresponding to that of the letter Γ needing to be supported during the additive manufacturing, and of portions having a cross-section, as a radial cross-section of the cylindrical element, of a shape corresponding to that of the letter Y not supported during the additive manufacturing.

With this solution, the stiffener is adapted to additive manufacturing by guaranteeing both a minimum quantity of cellular support and satisfactory post-additive manufacturing reworking operation.

The invention also relates to a bearing support thus defined, wherein each portion having a Y-shaped cross-section includes a first ramp that extends beyond the cylindrical element and a second ramp that extends beyond the first ramp to join the cylindrical element.

The invention also relates to a bearing support thus defined, wherein the cylindrical element includes a recess at each portion having a Y-shaped cross-section.

The invention also relates to a bearing support thus defined, wherein at least one portion having a Γ-shaped cross-section forms a fastening portion coming from the machining of an excess thickness formed by additive manufacturing.

The invention also relates to an aircraft engine comprising a bearing support thus defined.

The invention also relates to a method for obtaining by additive manufacturing a bearing support thus defined, including a step of forming by additive manufacturing in a single piece a blank part on the manufacturing platform, and of which the manufacture of the stiffener involves the forming of supports that support only the portions having a Γ-shaped cross-section.

DETAILED DISCLOSURE OF PARTICULAR EMBODIMENTS

Bearing Support

According to the invention, the bearing support is a metal part formed in a single piece by additive manufacturing, including in particular a fastening cone and a cylindrical element surrounding this cone, instead of manufacturing them separately to then assemble them.

Figure 1:
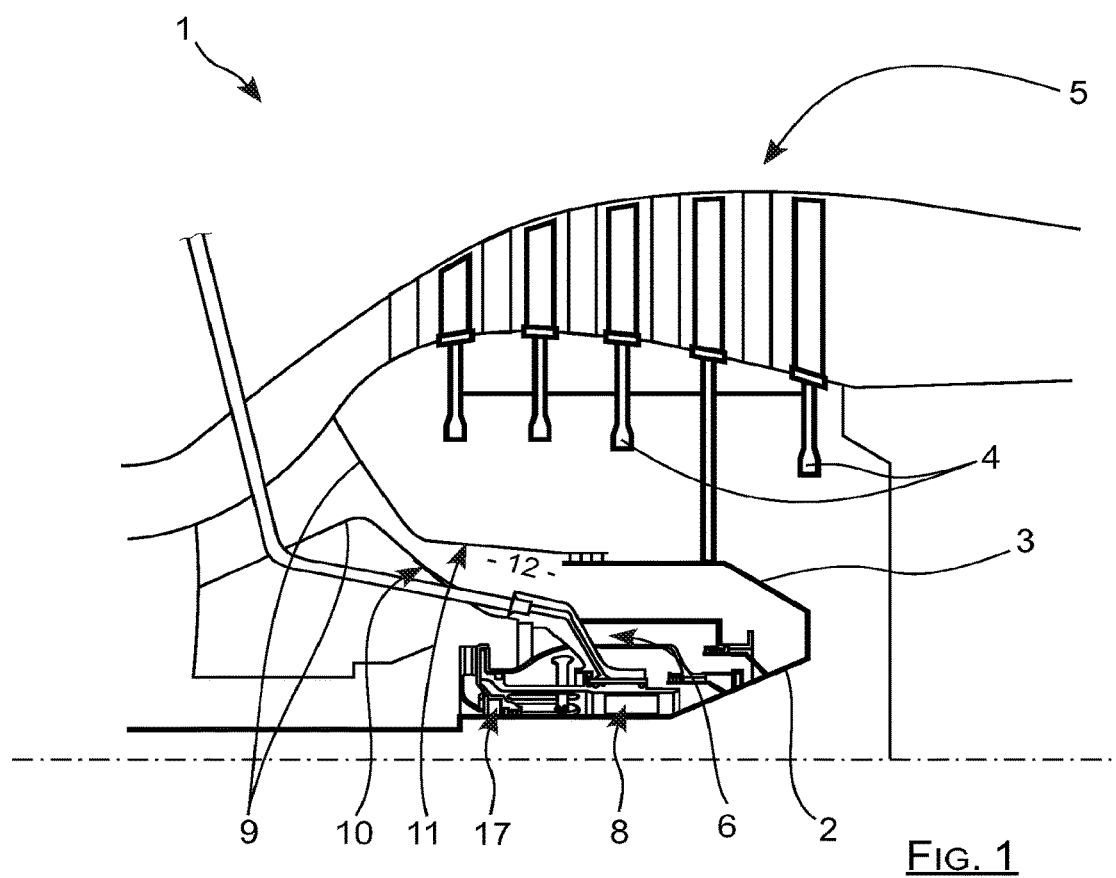
FIG. 1 already described is a diagrammatical cross-section view of a section of a downstream portion of a turbojet.
Figure 2:
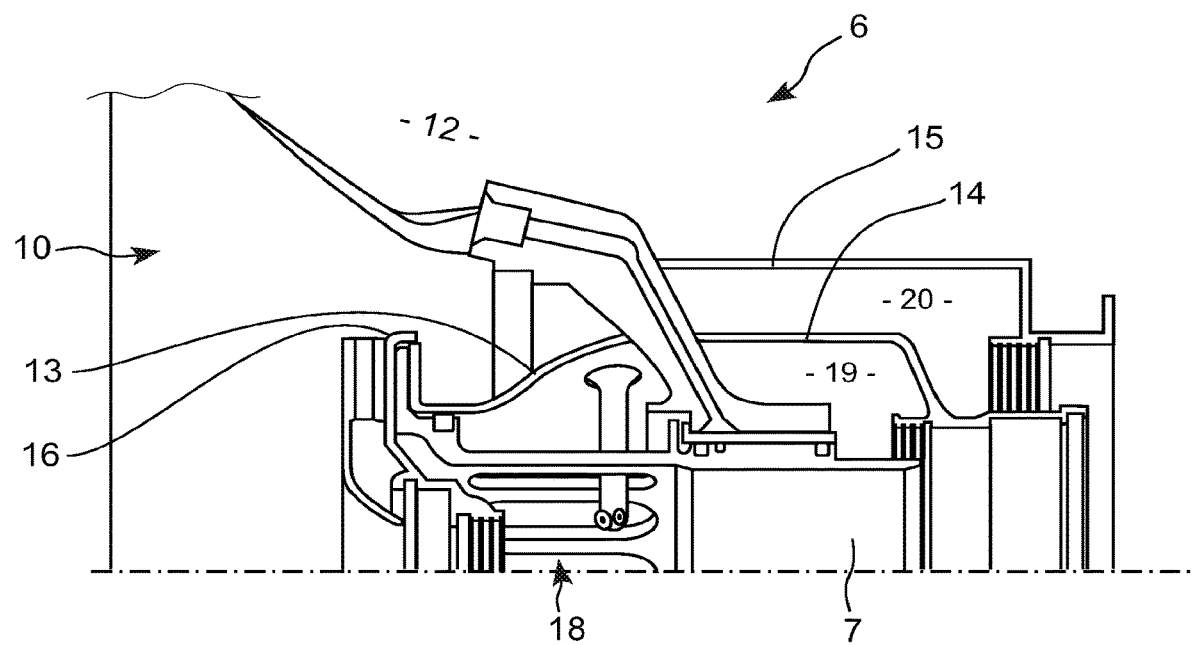
FIG. 2 already described is a cross-section view of a portion of a section of a downstream portion of a turbojet.
Figure 3:
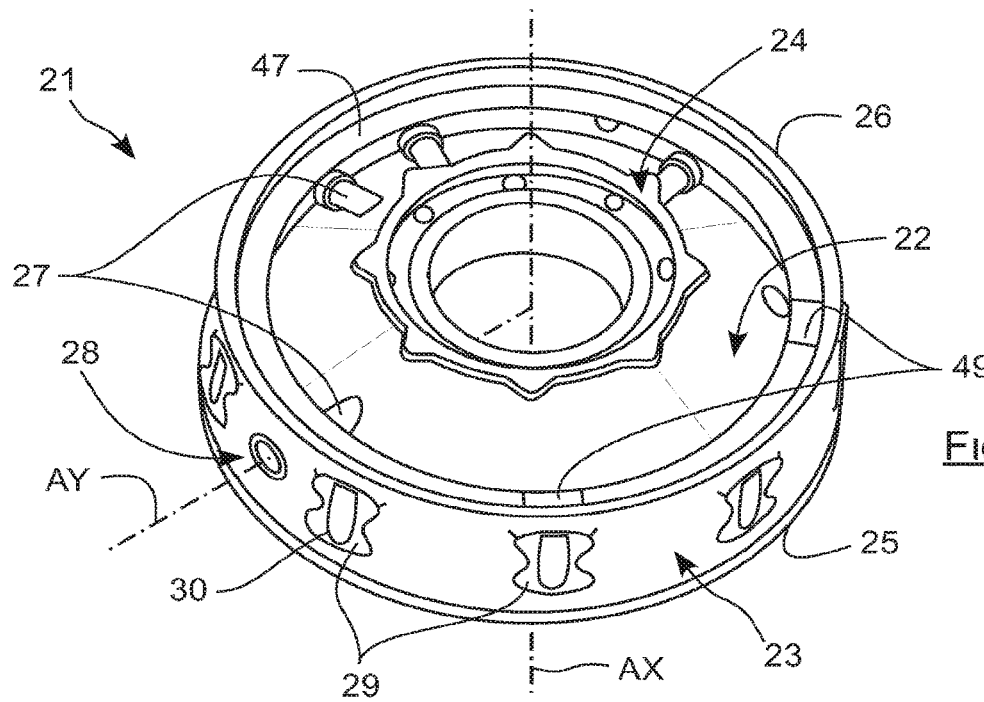
FIG. 3 is a perspective view of a bearing support manufactured in accordance with the invention.

This bearing support which appears in FIG. 3 where it is marked by 21 includes a truncated cone or cone 22, having its large diameter periphery extended by a generally cylindrical element 23, and having its small diameter periphery extended by a ring 24. The bearing support 21 has a general shape of revolution about an axis AX coinciding with the longitudinal axis of the engine wherein it is intended to be mounted, the cone 22 and the cylindrical element 23 having this axis AX as axis of revolution.

The cylindrical element 23 extends from a first edge 25 to a second edge 26 that are circular having substantially the same diameters while being separated from each other along the axis AX. The first edge 25 is the closest to the large diameter periphery of the cone 22, this cone having a diameter that narrows approaching the second edge 26.

The bearing support 21 further includes four ducts 27, wherein circulates oil and/or air, that pass through the cone 22 radially with respect to the axis AX by extending to the vicinity of the cylindrical element 23. An orifice 28 is formed in the cylindrical element facing each duct 27.

This bearing support also includes bosses 29 that radially extend beyond the cylindrical element 23 outwards by being regularly spaced along the circumference thereof. Each boss 29 includes a central window 30 i.e. an opening that places in communication the inside and the outside of the cylindrical element 23.

Figure 4:
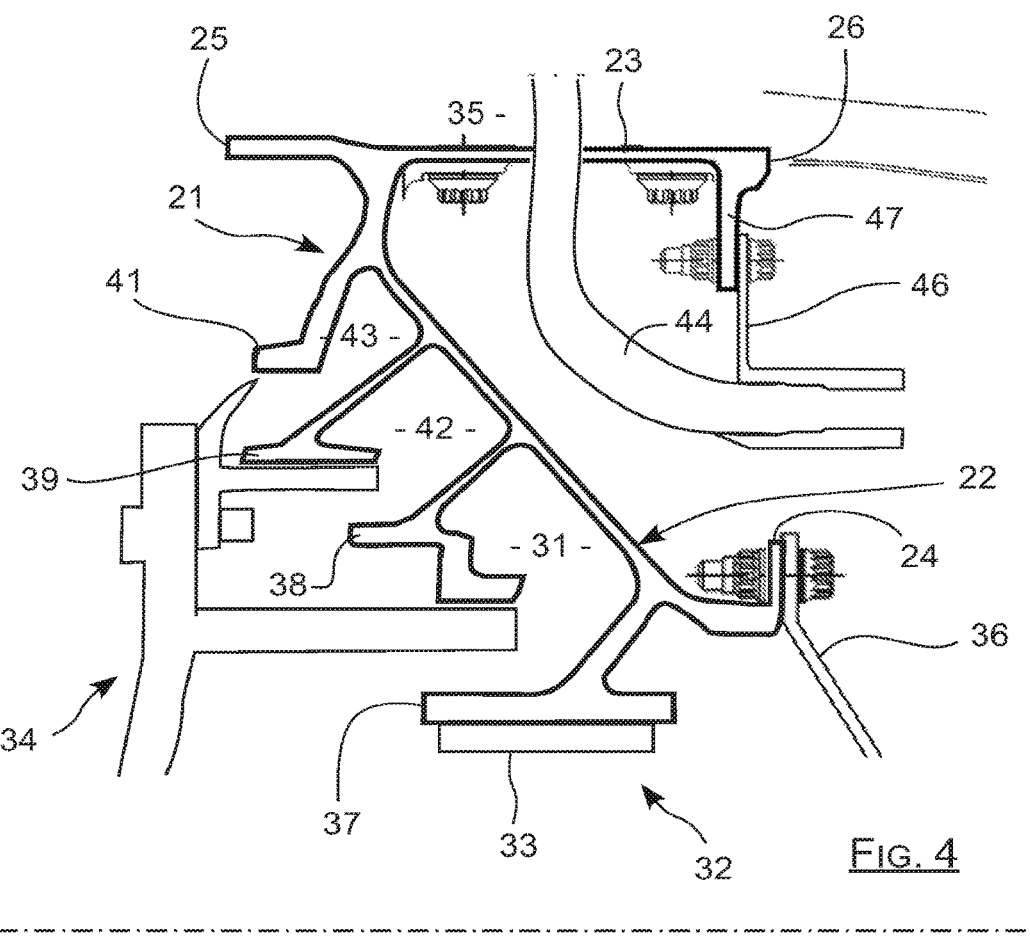
FIG. 4 is a cross-section view of a portion of an aircraft engine provided with a bearing support manufactured in accordance with the invention.

FIG. 4 shows a portion of an aircraft engine provided with a bearing support of the type of the support 21 defining a main enclosure 31 that surrounds a bearing 32 clamping an outer bearing ring 33. This main enclosure 31 is defined by a shaft portion 34 of axis AX, by the bearing support 21 of which the cylindrical element 23 is fastened to a stationary element 35 of the engine, and by a ferrule 36, fastened to the ring 24 that extends the bearing support 21 to the axis AX.

A series of rings 37, 38, 39, 41 extend beyond the cone 22 to the axis AX. The first ring 37 extends beyond in the main enclosure 31 to carry the ring 33. Each other ring 38, 39 and 41 is contiguous with a corresponding portion of the shaft 34, to define with it two annex annular enclosures 42 and 43.

When the bearing support 21 is integrated into the engine, it is provided with at least one pipe 44 that radially passes through a window 30, and folds back parallel to the axis AX. This pipe 44 is carried by a retaining member 46 fastened to a stiffener 47. This stiffener 47 has the shape of an inner ring, i.e. radially extending beyond to the axis AX over the entire periphery of the cylindrical element, by being located in the vicinity of the second edge 26. Such a bearing support typically includes two pipes of the type of pipe 44, spaced from one another by an angle of thirty degrees about the axis AX.

Stiffener portions marked by 48 are distinguished which are located in the extension of the windows 30, and having a Γ-shaped cross-section, in other words having a shape that corresponds to that of the letter Γ as a radial cross-section of the cylindrical element, by extending perpendicularly to the axis AX. Two of these portions having a Γ-shaped cross-section 48 form fastening parts marked by 49 in FIG. 3, at which the retaining members 46 are fastened to this stiffener 47.

These fastening parts 49 undergo post-additive manufacturing a reworking consisting of flattening them via surface machining to clear them of the partially melted/sintered grains of powder that extend beyond and alter the assembly feasibility of the retaining members 46. To this effect, the fastening parts 49 of the blank part, in other words of the bearing support 21 at the output of the laser melting/sintering machine, includes an excess thickness intended to be machined.

Additive Manufacturing

Powder-bed additive manufacturing designates the adding of material layer by layer, on a manufacturing platform of a dedicated machine, to form a physical object from a digital model. In the case of a metal part, use is made of the laser melting/sintering method which consists of totally or partially melting a thin layer of powder material using a laser at each pass.

Figure 5:
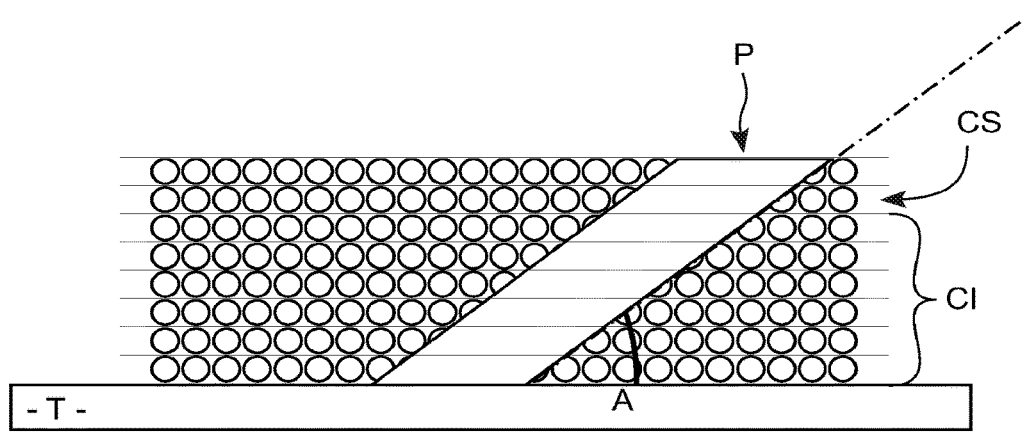
FIG. 5 diagrammatically shows a problem of collapsing during the additive manufacturing of a part.

The powder used in laser melting/sintering is not self-supporting. As can be seen in FIG. 5, during the manufacture of a part P, the non-melted/sintered powder of the lower layers marked by CI, i.e. that is not swept by the laser, is not able to support the melted powder of a consecutive upper layer CS beyond a minimum clearance angle A between the part P and the manufacturing platform T.

To solve this question, all is formed by manufacturing the part, supports that support each region having a clearance angle less than the minimum angle A, in order to prevent a local collapse. The part and the supports are integral, manufactured at the same time and made from the same material.

Once the additive manufacturing is complete, the supports constitute non-functional material and thus must be removed, for example by machining. To this effect, these supports are elements that are entirely cellular, generally in the form of trellis or coming from the ordered stacking of so-called lattice structure, consuming less powder while still being more easily removable than a uniform block of material.

During the manufacture thereof, the bearing support 21 is oriented in such a way that its axis of revolution AX is normal to the platform T, by starting with the formation of the first edge 25 of the cylindrical element 23. In the example of the figures, the minimum clearance angle A is defined at 40° with respect to the platform T, and certain regions of the bearing support 21 have a clearance angle less than this minimum angle A, and therefore require being supported.

In the rest of the following description, the terms "lower" and "upper" are to be considered with respect to the direction of manufacture of the bearing support from the manufacturing platform T. An element is said to be upper with respect to another if it is further away from the disc platform T than the other, and an element is said to be lower with respect to another if it is not as far away from the platform T as the other.

Manufacture of the Bearing Support with Supports According to the Prior Art

Figure 6:
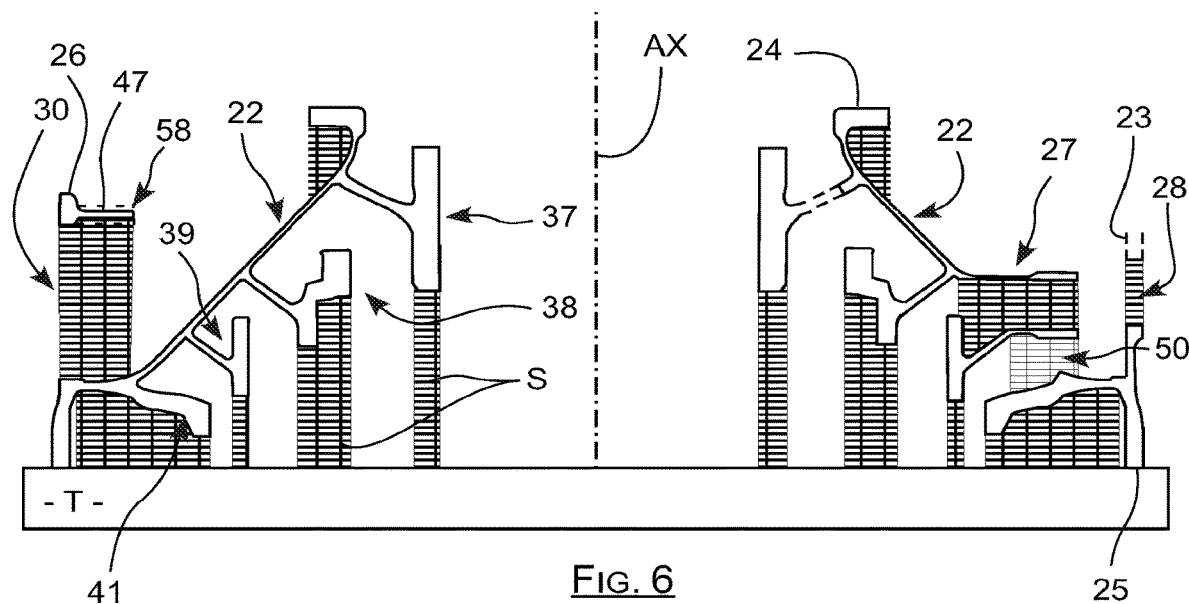
FIG. 6 is a cross-section view of a bearing support with supports formed according to the Prior art.

The example of FIG. 6 shows supports S for the manufacture of the bearing support 21 that are entirely cellular and arranged according to the Prior art, and wherein each ring 37, 38, 39 and 41 requires a support erected from the platform T, since the faces from which their manufacture begins are at a distance from the platform T and parallel to the latter, having in fact a clearance angle of 0°.

Supports S are also necessary for the formation of the ducts 27, orifices 28 and windows 30. Moreover, the cone 22 comprises a through-hole 50 formed under the ducts 27, which requires locally supporting the ring 39 with a support erected from the ring 41 located underneath.

Regarding the ring 24 and the portions having a Γ-shaped cross-section 48 located at windows 30, they extend normally to the axis AX. This ring 24 and these portions having a Γ-shaped cross-section 48 are thus parallel to the platform T, and require in fact being supported by supports erected from the bearing support 21, in particular at the cone 22.

The excess thickness of the fastening portions 49 is marked here in a dotted line by 58, whereas the portions having a Γ-shaped cross-section 48 do not all have such as fastening portion 49.

Stiffener According to the Invention

In light of the quantity of cellular supports already required for the manufacture of the portions having a Γ-shaped cross-section 48, located in the radial extension of the windows 30, the idea at the basis of the invention is to provide an annular stiffener 47 with a changing section in order to prevent the formation of additional supports.

Figure 7:
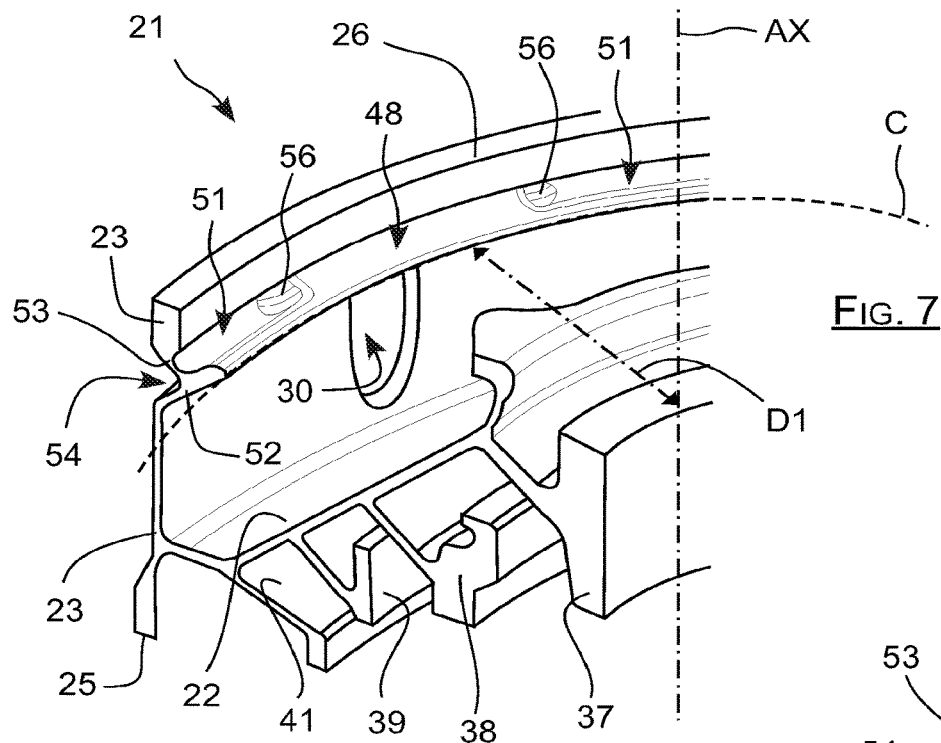
FIG. 7 is a cross-section and perspective view of a bearing support according to the invention.

To this effect, the portions having a Γ-shaped section 48 are connected together by intermediate portions 51 having a section that has a shape corresponding to the letter Y along a radial cut plane of the cylindrical element that passes through the bearing support between two windows 30, as shown in FIG. 7. In other words, the stiffener 47 is formed from an alternation between portions having a Γ-shaped cross-section 48 and portions having a Y-shaped cross-section 51, along the circumference thereof.

Each portion having a Y-shaped cross-section 51 comprises a first ramp 52 that extends the cylindrical element 23 by folding back towards the axis AX by forming with the platform T an angle of 40°. This first ramp 52 branches in the central region to form a second ramp 53 that forms an angle of 40° with the platform T, by extending perpendicularly to the first ramp to join the cylindrical element 23 extending to the second circular edge 26.

Figure 8:
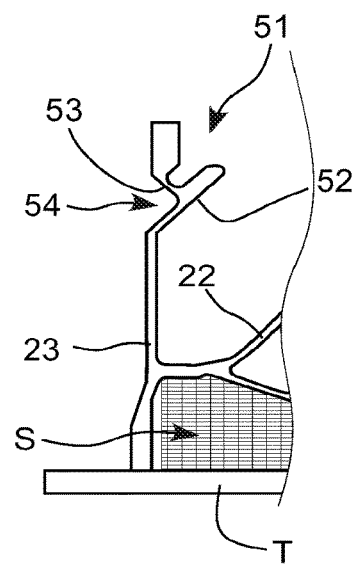
FIG. 8 is a diagrammatical view of a portion of a bearing support blank according to the invention.

Furthermore, the cylindrical element 23 includes recesses marked by 54, that follow the contour of the stiffener portions having a Y-shaped cross-section 51 to lighten the global mass of the bearing support 21, by respecting a clearance angle value greater than 40°. With this arrangement, the manufacturing of portions having a Y-shaped cross-section 51 and recesses 54 does not require cellular support S as shown in FIG. 8.

Figure 9:
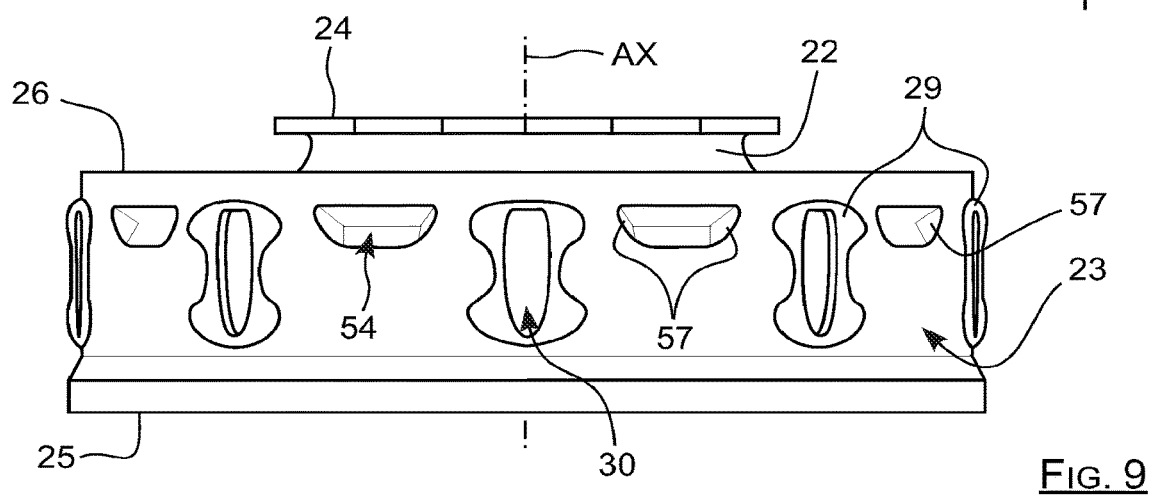
FIG. 9 is a side view of the bearing support according to the invention.

At the junctions between the portions of stiffener having a Y-shaped cross-section 51 and those having a Γ-shaped cross-section 48, the sharp edges are softened by an inner fillet marked by 56 in FIG. 7 and, in the same way, the sharp edges at the junction between the recesses 54 and the rest of the structure of the cylindrical element 23 are softened by an outer fillet marked by 57 in FIG. 9.

Figure 10:
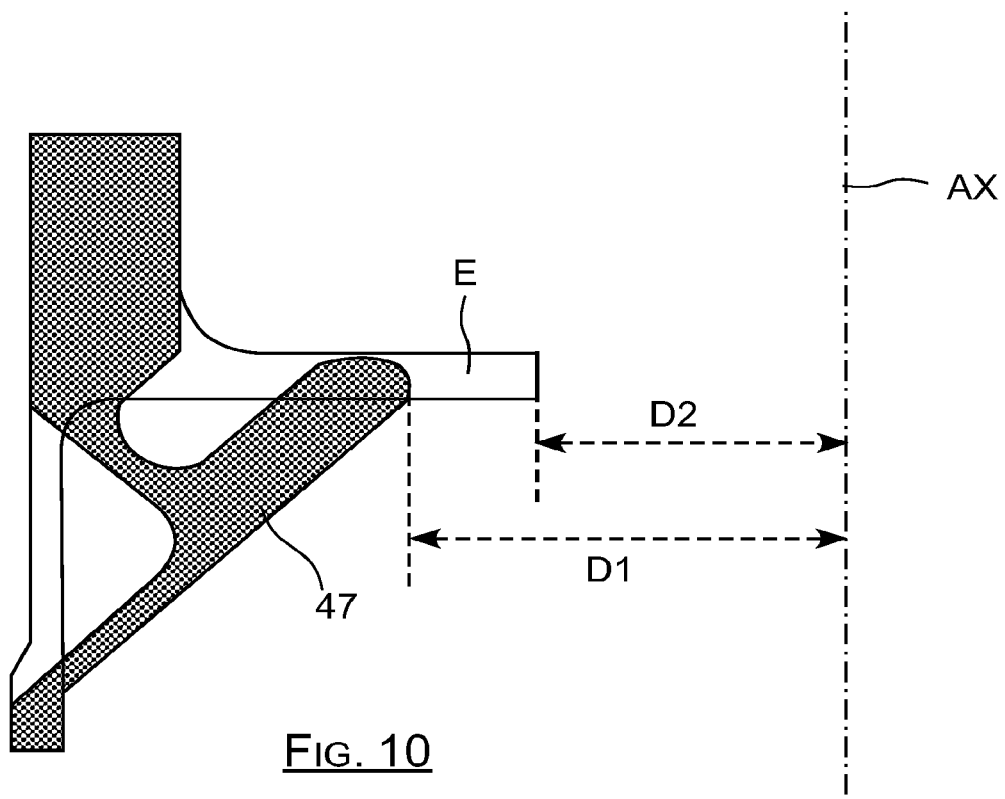
FIG. 10 is a diagrammatical comparison of a stiffener of the prior art with a stiffener according to the invention.

The stiffener 47, coming from the association of the portions having a Γ-shaped cross-section and having a Y-shaped cross-section, define a continuous inner circle C of diameter D1, which corresponds to its most advanced state towards the axis AX. Beyond the limitation of the supports required for the manufacture thereof and induced removal costs, the changing form of the stiffener 47 also constitutes a gain in machining simplicity of the fastening parts 49, in comparison with a continuous stiffener of the prior art with a Γ-shaped section over 360° about the axis AX. Indeed, as shown in FIG. 10 that superposes the contour of the changing stiffener 47 according to the invention, at a portion having a Y-shaped cross-section, with that of a stiffener of the prior art marked by E, i.e. continuous with a Γ-shaped section over the entire circumference thereof, this would entail that the stiffener E has an inner diameter D2 less than D1 in order to retain the same mechanical properties as the latter, such as mass and flexibility.

Figure 11:
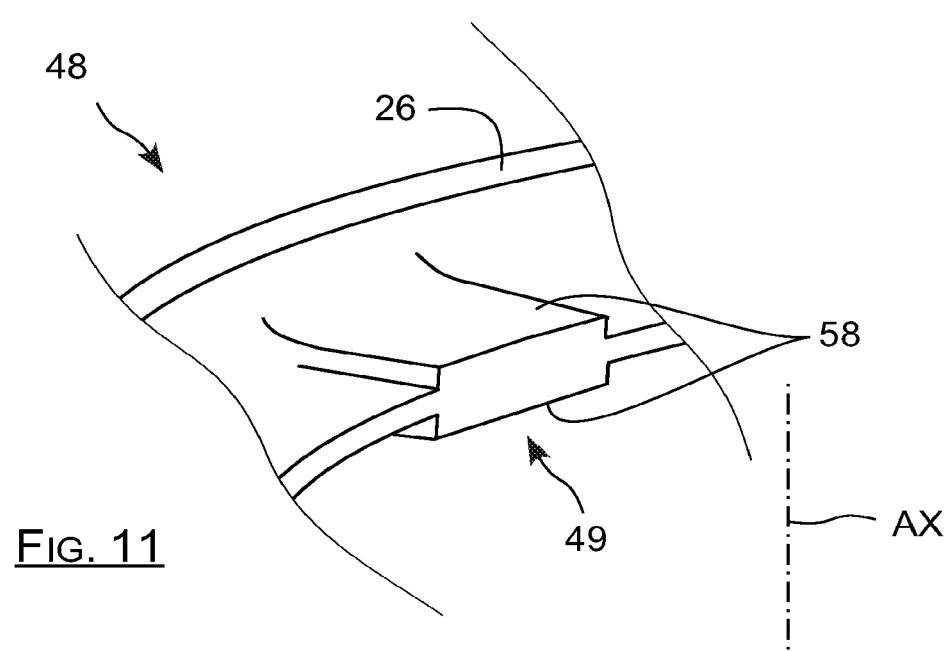
FIG. 11 is a detailed view of a portion of a stiffener forming a fastening portion according to the invention.

The invention makes it possible to increase the inner diameter of the stiffener 47, leaving a larger space for the access of a standard tool during the machining of the excess thickness 58 of the fastening portions 49 formed at portions having a Γ-shaped cross-section 48, as shown in more detail in FIG. 11 once the supports S are removed. Otherwise, i.e. in the case of a stiffener E, the complexity of the bearing support and the size induced by the diameter D2, would require the use of specific tools dedicated solely to the machining operation of the fastening parts 49.

Generally, the shape of the stiffener 47 according to the invention is adapted to additive manufacturing by guaranteeing both a minimum quantity of cellular support and a satisfactory machining, in other words not requiring any specific tools.

In our case, the value of the minimum clearance angle A is defined at 40° in relation to the platform T. It is however to be noted that the value of this minimum clearance angle A is not necessarily equal to 40°, given that it depends on the nature of the powder used. In this respect, note that the invention could provide that the stiffener portions having a Y-shaped cross-section, in particular the ramps 52, 53, as well as the recesses 54, form angles with the platform T of a different value in order to respect a new angle value A.

The invention claimed is:

1. A bearing support for an aircraft engine, manufactured in one piece by a powder-bed additive manufacturing from a manufacturing platform, comprising a cylindrical element including an annular stiffener with a cross-section that changes along a circumference of the annular stiffener, said stiffener being formed with a plurality of first portions having a first cross-section, as a first radial cross-section of the cylindrical element, of a shape corresponding to letter Γ needing to be supported during the additive manufacturing, alternating with a plurality of second portions having a second cross-section, as a second radial cross-section of the cylindrical element, of a shape corresponding to letter Y not supported during the additive manufacturing.

2. The bearing support according to claim 1, wherein each of the second portions comprises a first ramp that extends beyond the cylindrical element and a second ramp that extends beyond the first ramp to join the cylindrical element.

3. The bearing support according to claim 1, wherein the cylindrical element comprises a recess at each of the second portions.

4. The bearing support according to claim 1, wherein at least one of the first portions forms a fastening portion coming from a machining of an excess thickness formed by the additive manufacturing.

5. An aircraft engine comprising the bearing support according to claim 1.

6. A method for obtaining, via the additive manufacturing, the bearing support according to claim 1, said method comprising a step of forming, by the additive manufacturing, a blank part in a single piece on the manufacturing platform, and a step of manufacturing the stiffener comprising forming supports that support only the first portions.

\* \* \* \* \*